(12) United States Patent
Kim et al.

(10) Patent No.: US 11,915,477 B2
(45) Date of Patent: Feb. 27, 2024

(54) VIDEO PROCESSING SYSTEM AND VIDEO PROCESSING METHOD USING SPLIT LEARNING

(71) Applicant: Korea University Research and Business Foundation, Seoul (KR)

(72) Inventors: Joongheon Kim, Seoul (KR); Yoo Jeong Ha, Seoul (KR); Minjae Yoo, Seongnam-si (KR); SooHyun Park, Incheon (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/720,735

(22) Filed: Apr. 14, 2022

(65) Prior Publication Data

US 2023/0146260 A1 May 11, 2023

(30) Foreign Application Priority Data

Nov. 5, 2021 (KR) .................. 10-2021-0151177

(51) Int. Cl.
| | |
|---|---|
| *G06V 20/17* | (2022.01) |
| *B64C 39/02* | (2023.01) |
| *G06V 20/52* | (2022.01) |
| *G06N 3/045* | (2023.01) |
| *B64U 101/30* | (2023.01) |

(52) U.S. Cl.
CPC .............. *G06V 20/17* (2022.01); *B64C 39/024* (2013.01); *G06N 3/045* (2023.01); *G06V 20/52* (2022.01); *B64U 2101/30* (2023.01); *B64U 2201/20* (2023.01)

(58) Field of Classification Search
CPC ...... G06V 20/17; G06V 20/52; B64C 39/024; G06N 3/045; B64U 2101/30; B64U 2201/20

See application file for complete search history.

(56) References Cited

U.S. PATENT DOCUMENTS

| | | | |
|---|---|---|---|
| 11,508,042 B1* | 11/2022 | Knuffman | G06T 5/005 |
| 2021/0279852 A1* | 9/2021 | Jakka | G06F 18/2413 |
| 2022/0026920 A1* | 1/2022 | Ebrahimi Afrouzi | G06N 3/045 |
| 2022/0058411 A1* | 2/2022 | Hanada | G06N 3/063 |
| 2022/0189152 A1* | 6/2022 | Kanda | G06N 3/04 |
| 2022/0292291 A1* | 9/2022 | Berman | G06F 18/285 |

FOREIGN PATENT DOCUMENTS

| | | |
|---|---|---|
| KR | 10-1648188 B1 | 8/2016 |
| KR | 10-1992739 B1 | 6/2019 |
| KR | 10-2095555 B1 | 3/2020 |
| KR | 10-2203292 B1 | 1/2021 |
| KR | 10-2307363 B1 | 9/2021 |

* cited by examiner

*Primary Examiner* — Nasim N Nirjhar
(74) *Attorney, Agent, or Firm* — NSIP Law

(57) ABSTRACT

Disclosed is a video processing system including multiple unmanned aerial vehicles (UAVs) configured to capture a video of a fire site, wherein each UAV has a control unit including an input layer and a first hidden layer (hidden layer 1) and a central server connected to the multiple UAVs by wireless communication, wherein the central server includes multiple hidden layers and an output layer. The video processing system performs a learning process to determine whether a fire has occurred using a feature map in which an original video is difficult to recognize and personal information is protected. Thus, it is possible to fundamentally prevent the exposure and infringement of personal information.

7 Claims, 9 Drawing Sheets

VIDEO PROCESSING SYSTEM AND VIDEO PROCESSING METHOD USING SPLIT LEARNING

CROSS-REFERENCE TO RELATED APPLICATION

This application claims priority to and the benefit of Korean Patent Application No. 10-2021-0151177, filed on Nov. 5, 2021, the disclosure of which is incorporated herein by reference in its entirety.

BACKGROUND

1. Field of the Invention

The present invention relates to a video processing system and method using split learning, and in particular, to a video processing system and method that perform a learning process by protecting personal information of video information captured by an unmanned aerial vehicle (UAV) using split learning.

2. Discussion of Related Art

Conventionally, in order to eradicate crimes such as theft, arson, and fraud or crimes against people, property, or public order, surveillance using closed-circuit televisions (CCTVs) provided on streets has become common. Also, surveillance using CCTVs is widely used for crime detection and is often released to the public through the media.

However, video information captured by a CCTV camera includes, for example, car license plate numbers, people in vulnerable situations, or even some terrible accident scenes.

There are a number of situations in which a large amount of video information captured by these CCTV cameras is hacked. Currently, CCTVs can be built and used by anyone as needed without any restrictions, and thus there are constant concerns about invasion of privacy and misuse and abuse of video information that may occur in the process of collecting videos from unspecified people.

In particular, in the real situation in which subjects who install and operate CCTVs have unilateral authority in managing recorded video information, when videos are requested by outsiders such as investigative agencies or crime victims, there is no choice but to provide or reject the request without clear standards, and also there is a security vulnerability because it is necessary to access a video server and check videos through an authentication process including a normal login.

In order to solve these problems, various techniques related to video data encryption have been disclosed. These algorithms, which are represented by symmetric key encryption and asymmetric key encryption algorithms, employ a method in which data cannot be decrypted without a key by manipulating data in a form that cannot be reverse mapped based on a key value to add redundancy.

However, these methods have a weakness in that data is hacked when keys are exposed. In relation to the distribution of these keys, a dedicated network with high security may be used, or double or triple encryption, which encrypts one key with another key, may be adopted. However, there is still a possibility of exposure of personal information, and there is also a problem of increasing system complexity.

SUMMARY OF THE INVENTION

The present invention has been devised to solve the above problems, and an object of the present invention is to provide a video processing system for performing a learning process by protecting personal information of video information captured by a unmanned aerial vehicle (UAV) using split learning. Another object of the present invention is to provide a video processing method for performing a learning process by protecting personal information of video information captured by a UAV using split learning.

According to an aspect of the present invention, there is provided an image processing system including multiple unmanned aerial vehicles (UAVs) configured to capture a video of a fire site, wherein each UAV has a control unit including an input layer and a first hidden layer (hidden layer 1) and a central server connected to the multiple UAVs by wireless communication, wherein the central server includes multiple hidden layers and an output layer.

A deep neural network may be composed of the input layer, the first hidden layer (hidden layer 1), the multiple hidden layers, and the output layer.

The control unit of each of the multiple UAVs may transmit, to the central server through a transceiving unit, a feature map obtained by distorting the video via the input layer and the first hidden layer (hidden layer 1).

According to another aspect of the present invention, there is provided a video processing method including operations of: (A) allowing a central control unit of a central server to transmit a signal for requesting video information of a fire site to each of multiple UAVs through a central transceiving unit; (B) allowing a control unit of each of the UAVs to extract a feature map obtained by distorting acquired video information of the fire site and transmit the feature map to the central server; (C) allowing the central control unit of the central server to sum and regenerate the feature map; (D) allowing the central control unit to perform computation by substituting the regenerated feature map into an activation function; (E) allowing the central control unit to execute a pooling operation using a value output using the activation function; (F) allowing the central control unit to compute a loss value using a pooling operation value and a preset target output value; (G) allowing the central control unit to acquire a modified value for a parameter using the computed loss value and update the parameter using the acquired modified value for the parameter; and (H) allowing the central control unit to re-execute operations (C) to (G) using the updated parameter.

The control unit of each of the UAVs may have an input layer and a first hidden layer (hidden layer 1), the central control unit may have multiple hidden layers and an output layer, and a deep neural network may be composed of the input layer, the first hidden layer (hidden layer 1), the multiple hidden layers, and the output layer.

Operation (B) may further include an operation of allowing the control unit of each of the UAVs to execute a convolution operation on the video information using a filter.

Operation (C) may further include operations of (C-1) allowing the central control unit to concatenate the summed feature map and (C-2) allowing the central control unit to perform a convolution operation on the concatenated feature map.

Operations (B) to (H) use a split learning algorithm for spatiotemporal learning using the deep neural network.

Features and advantages of the present invention will become apparent from the following detailed description based on the accompanying drawings.

Prior to this, terms and words used in the present specification and claims should not be interpreted by their usual and dictionary meanings but should be interpreted as having meanings and concepts consistent with the technical spirit of the present invention on the basis of the principle that an inventor can appropriately define the concepts of terms so as to explain his or her invention in the best way.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
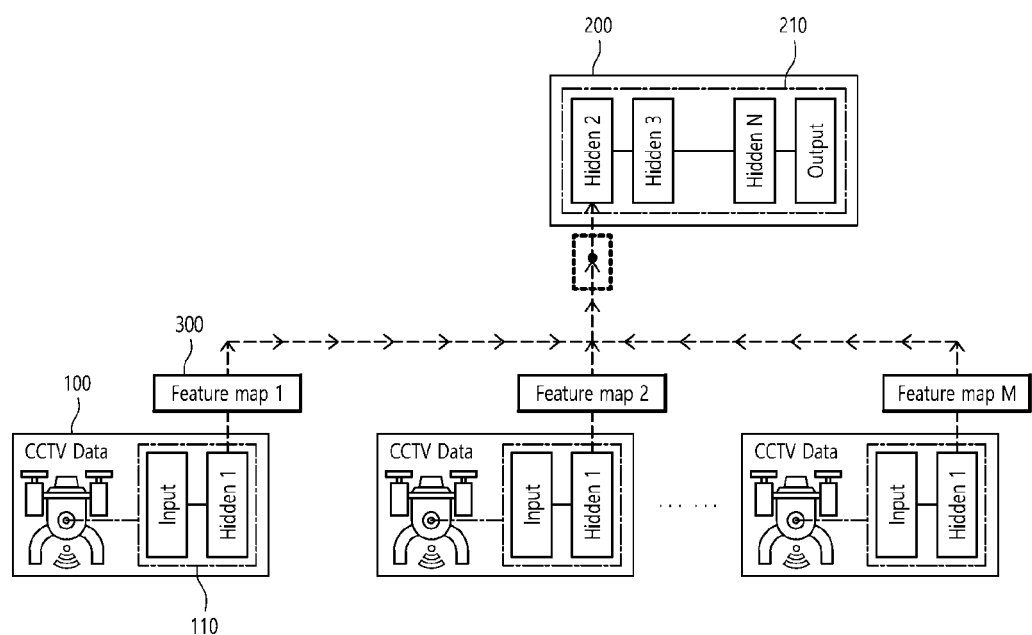
FIG. 1 is a block diagram showing a video processing system according to an embodiment of the present invention.

Objects, specific advantages, and novel features of the present invention will become more apparent from the following detailed description and embodiments in conjunction with the accompanying drawings. In the present specification, it should be noted that, when reference numerals are added to the components of each drawings, only the same components are given the same number as much as possible even though they are indicated on different drawings. Also, terms such as first, second, and the like may be used to describe various elements, but the elements are not limited by the terms. These terms are only used to distinguish one element from another. Further, in describing the present invention, detailed descriptions on well-known technologies will be omitted when it is determined that they may unnecessarily obscure the gist of the present invention.

Hereinafter, exemplary embodiments of the present invention will be described in detail with reference to the accompanying drawings. FIG. 1 is a block diagram showing a video processing system according to an embodiment of the present invention, FIG. 2 is a block diagram showing an unmanned aerial vehicle (UAV) included in the video processing system according to an embodiment of the present invention, and FIG. 3 is a block diagram showing a central server included in the video processing system according to an embodiment of the present invention.

The video processing system according to an embodiment of the present invention may include a plurality of unmanned aerial vehicles (UAVs) 100 and a central server 200 connected to the plurality of UAVs 100 by wireless communication and may be a system for determining a crime site, an accident site, a fire situation, and the like using a split learning algorithm for spatiotemporal learning over a deep neural network.

The plurality of UAVs 100, which are unmanned aerial vehicles that fly automatically or semi-automatically according to a route pre-programmed on the ground with no pilots on board, may capture a video of a fire site in operative association with the central server 200 using, for example, a drone.

Figure 2:
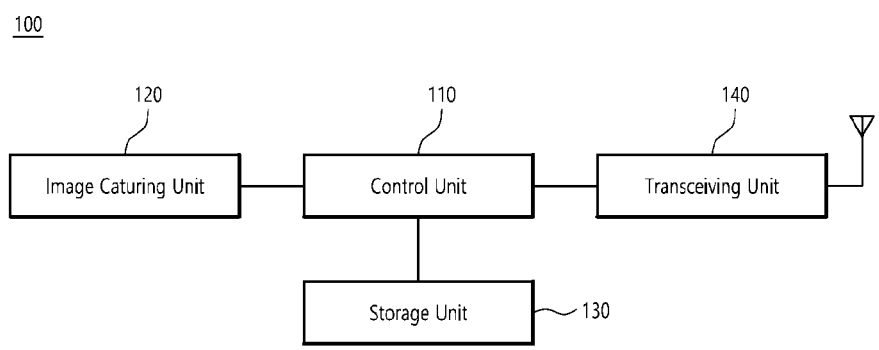
FIG. 2 is a block diagram showing an unmanned aerial vehicle (UAV) included in the video processing system according to an embodiment of the present invention.
Figure 3:
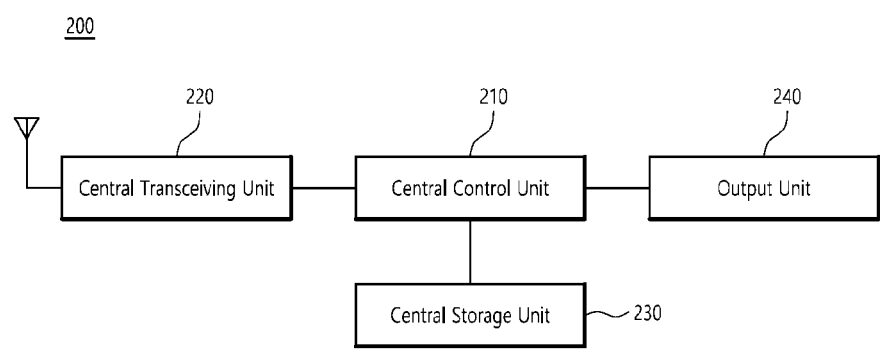
FIG. 3 is a block diagram showing a central server included in the video processing system according to an embodiment of the present invention.

Each of the UAVs 100 may include a control unit 110, an image capturing unit 120, a storage unit 130, and a transceiving unit 140, as shown in FIG. 2.

The control unit 110, which is a component for controlling the overall operation of the UAV 100, may transmit, to the central server 200 through the transceiving unit 140, a feature map 300 obtained by distorting video information acquired by the image capturing unit 120 via a first hidden layer (hidden layer 1) and an input layer of a deep neural network and may store the feature map 300 and the video information acquired by the image capturing unit 120 in the storage unit 130. Here, the deep neural network is an artificial neural network including multiple hidden layers between the input layer and the output layer and for example, a convolutional neural network (CNN) for video information processing may be applied.

The image capturing unit 120 may include a camera provided on one side of the UAV 100. In this case, the camera may include, for example, a charge-coupled device (CCD) camera. The image capturing unit 120 captures videos related to a crime site, a fire situation, and the like under the control of the control unit 110 and delivers the videos to the control unit 110.

The transceiving unit 140 transmits the feature map 300 to the central server 200 over a wireless network under the control of the control unit 110. Here, the wireless network includes, for example, a 3rd Generation Partnership Project (3GPP) network, a Long Term Evolution (LTE) network, a 5G network, a World Interoperability for Microwave Access (WIMAX) network, the Internet, a Local Area Network (LAN), a Wireless Local Area Network (Wireless LAN), a Wide Area Network (WAN), a Personal Area Network (PAN), WiFi network, a Bluetooth network, a satellite broadcasting network, an analog broadcasting network, a Digital Multimedia Broadcasting (DMB) network, and the like, but the present invention is not limited thereto.

In each of the UAVs 100 configured in this way, the control unit 110 extracts a feature map 300 obtained by distorting video information acquired through the image capturing unit 120 using convolution processing via the input layer and the first hidden layer (hidden layer 1) of the deep neural network and transmits the feature map 300 to the central server 200 through the transceiving unit 140.

Thus, each of the UAVs 100 extracts a feature map 300 that does not contain personal information and cannot be inferred from the video information acquired through the image capturing unit 120 and transmits the extracted feature map 300. That is, the UAV 100 extracts and transmits the feature map 300 in which an original video is difficult to recognize and personal information is protected.

The central server 200 may include a central control unit 210, a central transceiving unit 220, a central storage unit 230, and an output unit 240, as shown in FIG. 3.

The central control unit 210 is a component that controls the central server 200 as a whole. In particular, the central control unit 210 may determine whether a fire has occurred by learning the feature map 300, which is received from each of the UAVs 100 through the central transceiving unit 220, via multiple hidden layers and the output layer included in the deep neural network and may display a result of determining whether a fire has occurred through the output unit 240. In this case, as shown in FIG. 1, the central control unit 210 includes multiple hidden layers (hidden layer 2, . . . , hidden layer N) and the output layer other than the input layer and the first hidden layer of the deep neural network, as shown in FIG. 1.

Thus, in the video processing system according to an embodiment of the present invention, the control unit 110 of each of the UAVs 100 separately includes the input layer and the first hidden layer (hidden layer 1) of the deep neural network, and the central control unit 210 of the central server 200 separately includes the multiple hidden layers (hidden layer 2, . . . , hidden layer N) and the output layer. Accordingly, the layers have the characteristic of forming one deep neural network.

Under the control of the central control unit 210, the central storage unit 230 may store the feature map 300 received from each of the UAVs 100 through the central transceiving unit 220 and information that is obtained by determining whether a fire has occurred and is learned by the central control unit 210.

The central server 200 configured in this way performs a learning process to determine whether a fire has occurred using a feature map 300 in which an original video is difficult to recognize and personal information is protected. Thus, for example, it is possible to fundamentally prevent the exposure and infringement of personal information by hacking or the like.

Figure 4:
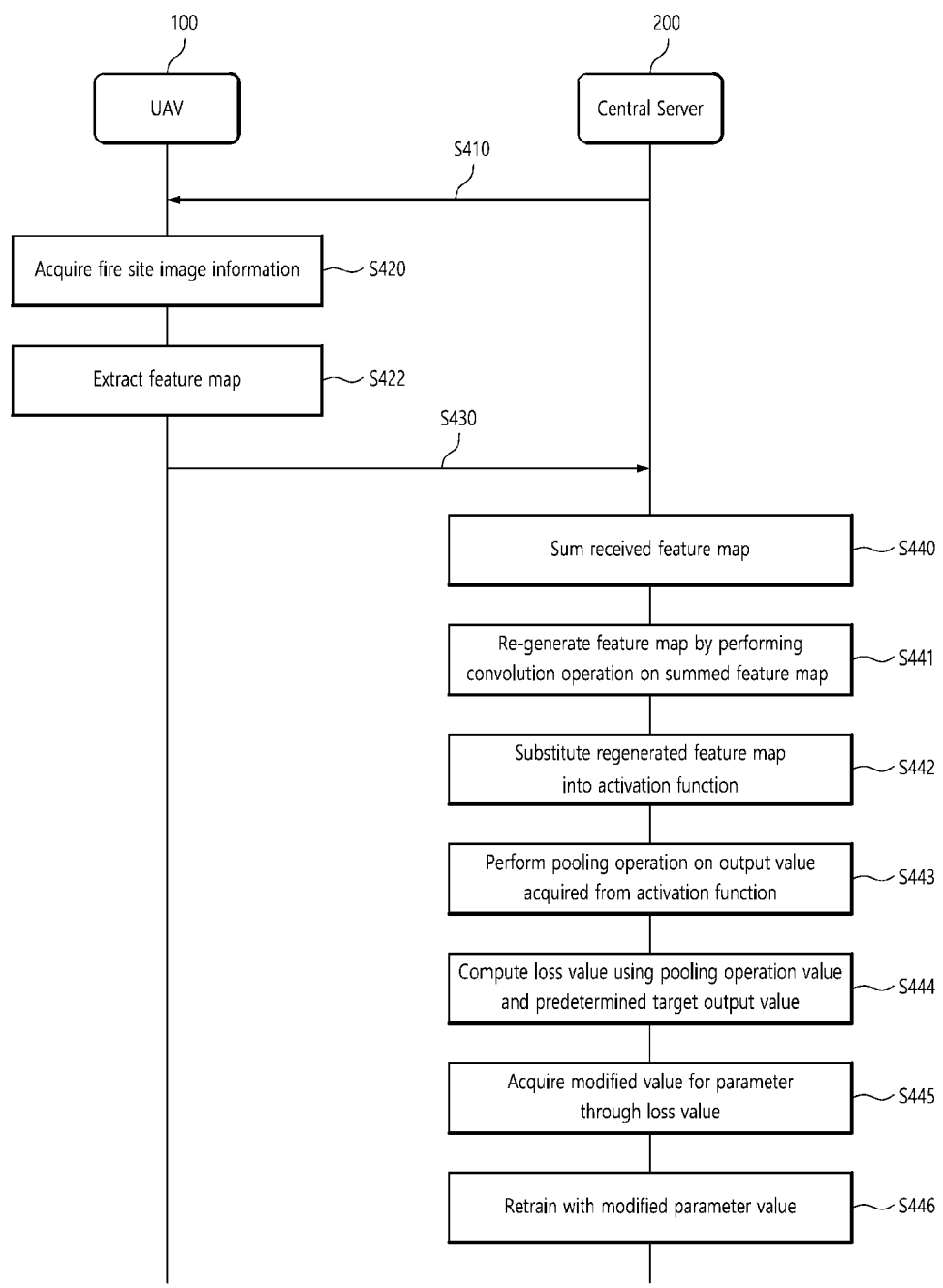
FIG. 4 is a flowchart illustrating a video processing method according to another embodiment of the present invention.
Figure 5A:
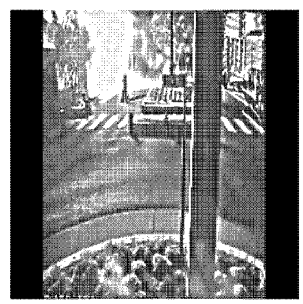
FIG. 5A shows a video image captured by a UAV according to the video processing method according to another embodiment of the present invention.
Figure 5B:
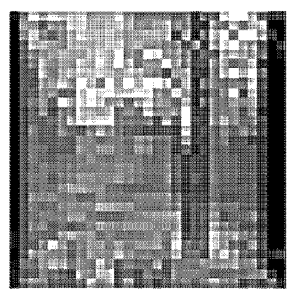
FIG. 5B shows a video image obtained by a UAV distorting the video image of FIG. 5A according to the video processing method according to another embodiment of the present invention.
Figure 6:
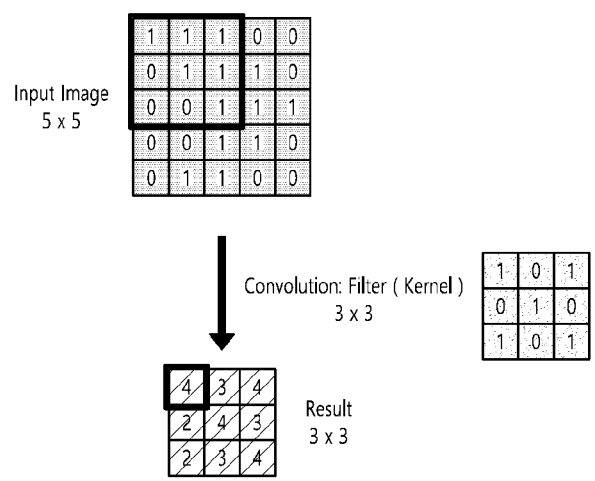
FIG. 6 is an exemplary diagram illustrating a process of a UAV distorting a video image according to the video processing method according to another embodiment of the present invention.
Figure 7:
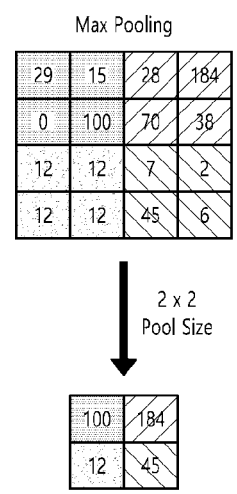
FIG. 7 is an exemplary diagram illustrating a process of a central server processing a video image according to the video processing method according to another embodiment of the present invention.
Figure 8:
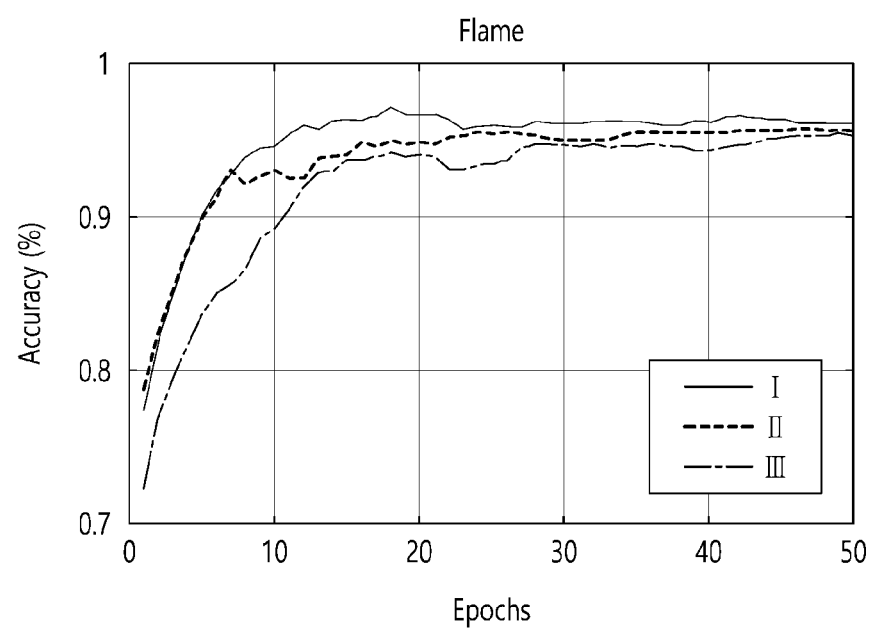
FIG. 8 is a graph illustrating fire classification accuracy according to comparative examples and embodiments of the present invention.

Hereinafter, a video processing method using the above-described video processing system according to another embodiment of the present invention will be described with reference to related drawings. FIG. 4 is a flowchart illustrating a video processing method according to another embodiment of the present invention, FIG. 5A shows a video image captured by a UAV according to the video processing method according to another embodiment of the present invention, FIG. 5B shows a video image obtained by a UAV distorting the video image of FIG. 5A according to the video processing method according to another embodiment of the present invention, FIG. 6 is an exemplary diagram illustrating a process of a UAV distorting a video image according to the video processing method according to another embodiment of the present invention, FIG. 7 is an exemplary diagram illustrating a process of a central server processing a video image according to the video processing method according to another embodiment of the present invention, and FIG. 8 is a graph illustrating fire classification accuracy according to comparative examples and embodiments of the present invention.

In the video processing method according to another embodiment of the present invention, as shown in FIG. 4, first, the central server 200 transmits a signal for requesting video information of a fire site to each of the UAVs 100 through the central transceiving unit 220 (S410).

In this case, the central control unit 210 of the central server 200 may transmit a signal for requesting the video information of the fire site to each of the multiple UAVs 100 close to the fire site through the central transceiving unit 220 over a wireless network.

Upon receiving the signal for requesting the video information of the fire site, each of the UAVs 100 acquires the video information of the fire site captured through the image capturing unit 120 (S420).

The video information of the fire site captured by each of the UAVs 100 through the image capturing unit 120 may be, for example, the video image shown in FIG. 5A. In addition, the video image may include personal information, such as, for example, car license plates, the faces of unspecified people, and the like.

Accordingly, the control unit 110 of each UAV 100 extracts the feature map 300 that is obtained by distorting the video image and that does not contain personal information and cannot be inferred (S422).

Specifically, as shown in FIG. 6, in the process of extracting the feature map 300, the control unit 110 of each of the UAVs 100 may include a process in which the pixel information of the video image is input to the input layer of the deep neural network and a convolution operation is executed using a filter via the first hidden layer.

In this case, the convolution operation using the filter may be executed using Equation 1 below.

$$\text{net}_{mn}^l = \sum_{i=0}^{size^l-1} \sum_{j=0}^{size^l-1} \left( O_{m+i,n+j}^{l-1} \ \cdots \ w_{i,j}^l + b^l \right) \quad \text{[Equation 1]}$$

$$\triangleright f_c = Conv(O^{l-1}, w^l, I_n I_a) = \text{net}_{I_n, I_a}^l$$

Here, l denotes a layer, $size^l$ denotes a layer size, In denotes the number of pieces of data input to an input layer, Ia denotes the number of labels, O denotes an output convolution layer, w denotes a weight, and b denotes a bias of the feature map 300.

The feature map 300 distorted through the convolution operation has a distorted image form that does not contain personal information and cannot be inferred, as shown in FIG. 5B.

After extracting the feature map 300, the control unit 110 transmits the feature map 300 to the central server 200 via the transceiving unit 140 using a wireless network (S430).

Subsequently, the central control unit 210 of the central server 200 may sum the feature map 300 received from the central transceiving unit 220 (S440) and may regenerate the feature map 300 by performing the convolution operation on the summed feature map 300 (S441).

At this time, the process of regenerating the feature map 300 may be executed by concatenating the summed feature map using Equation 2 below and performing the convolution operation using Equation 3 below.

$$\sum_{k=1}^n f_c^k \quad \text{[Equation 2]}$$

$$\text{net}_{mn}^l = \sum_{i=0}^{size^l-1} \sum_{j=0}^{size^l-1} \left( O_{m+i,n+j}^{l-1} \ \cdots \ w_{i,j}^l + b^l \right) \quad \text{[Equation 3]}$$

Here, In denotes the number of pieces of input data, Ia denotes the number of labels, O denotes an output convolution layer, and w denotes a weight.

In this case, fc represents a result of performing a convolution operation using the concatenated feature map and may denote a regenerated feature map.

After regenerating the feature map 300, the central control unit 210 may perform computation by substituting the regenerated feature map into an activation function (S442).

Here, the activation function may use a sigmoid function or ReLU function.

With respect to a value output using the activation function, the central control unit 210 executes a pooling operation using an acquired output value (S443).

Specifically, the pooling operation is for reducing the size of the dimension of data, and is an operation for reducing the size of the vertical and horizontal spaces in the data. The pooling operation may use various parameters, for example, an average, a median, a maximum value, a minimum value, etc. Here, the maximum pooling operation using the maximum value is applied. By using the maximum pooling operation (max pooling), it is possible to extract the maximum value from the limited region of the image, remove noise from the data, and prevent overfitting in the process of data reduction.

The maximum pooling operation may be executed using Equation 4 below.

$$\text{Pool}(x, i, j) = \frac{\sum_{m=1}^{size^l} \sum_{m=1}^{size^l} x^{l-1}_{size^l \times (i-1)+m, size^l \times (j-1)+n}}{size^l \times size^l}$$

$$\triangleright f_p = \text{Pool}(f_c, I_m, I_a)$$

[Equation 4]

Here, x denotes a matrix input for a pooling operation, 1 denotes a corresponding layer of a pooling operation, i denotes the rows of an input matrix, j denotes the columns of an input matrix, $size^l$ denotes a corresponding layer size of a pooling operation, Im denotes the number of pieces of data input to a corresponding layer of a pooling operation, and Ia denotes the number of labels.

After executing the pooling operation, the central control unit 210 calculates a loss value using a pooling operation value and a preset target output value (S444).

Specifically, the loss value may be calculated using MSLE in Equation 5 below, RMSLE in Equation 6 below, or sMAPE in Equation 7 below, and the preset target output value may be ground truth (GT).

In this case, GT may be, for example, a value obtained by performing a maximum pooling operation based on a convolutional operation value obtained by performing a convolution operation on the original image data of FIG. 5A in a hidden layer of the central server 200.

$$MSLE = \frac{1}{N} \sum_{i=0}^{N} (\log(y_i + 1) - \log(\hat{y}_i + 1))^2$$

[Equation 5]

$$RMSLE = \sqrt{\frac{1}{N} \sum_{i=0}^{N} (\log(y_i + 1) - \log(\hat{y}_i + 1))^2}$$

[Equation 6]

$$sMAPE = \frac{100\%}{n} \sum_{i=1}^{N} \left( \frac{|y_i - \hat{y}_i|}{|y_i| + |\hat{y}_i|} \right)$$

[Equation 7]

Here, $y_i$ denotes a pooling operation value of the pooling operation S443, and $\hat{y}_i$ denotes a preset target output value.

After calculating the loss value, the central control unit 210 acquires a modified value for a parameter using the calculated loss value (S445).

In this case, the parameter may refer to a weight of w, and the central control unit 210 may update the parameter by using the acquired modified value for the parameter.

Using the updated parameter, the central control unit 210 may re-execute the operation of regenerating the above-described feature map 300 (S441) to the operation of acquiring the modified value of the parameter (S445) a set number of times (S446).

When the re-execution process is completed once, learning is completed with epoch 1. When the re-execution process is repeated 50 times, learning is completed with epoch 50.

After the re-execution is performed the set number of times, the central control unit 210 may display the determination result of whether a fire has occurred through the output unit 240.

Accordingly, by increasing the number of times the re-execution process is performed, it is possible to further improve the accuracy of determining whether a fire has occurred.

Hereinafter, an experiment was conducted to confirm the performance of the video processing method according to another embodiment of the present invention.

Example 1

The video processing method according to another embodiment of the present invention was executed using three UAVs 100 and the central server 200. Also, 32 was used as a batch size, 64*64*1 was used as an input size, a sigmoid function was applied as an activation function, and a convolutional neural network (CNN) was used as a deep neural network model.

In this case, the experiment was conducted assuming that after the image data of the extracted feature map 300 is divided into train data and test data at a ratio of 8:2, the train data is equally divided into three UAVs 100 at a ratio of 1:1:1.

Example 2

The video processing method according to another embodiment of the present invention was executed using three UAVs 100 and the central server 200. Also, 32 was used as a batch size, 64*64*1 was used as an input size, a sigmoid function was applied as an activation function, and a convolutional neural network (CNN) was used as a deep neural network model.

In this case, the experiment was conducted assuming that after the image data of the extracted feature map 300 is divided into train data and test data at a ratio of 8:2, the train data is divided into three UAVs 100 at a ratio of 8:1:1.

Comparative Example

A video processing method using the conventional convolutional neural network (CNN) was executed using three UAVs 100 and the central server 200. Also, 32 was used as a batch size, 64*64*1 was used as an input size, and a sigmoid function was applied as an activation function.

In particular, three UAVs 100 directly transmit captured original images to the central server 200 without having an input layer and a first hidden layer, and a learning experiment was conducted using the convolutional neural network (CNN) in the central server 200.

As shown in FIG. 8, as the experiment results based on the conditions, the result of the comparative example is shown as a graph of "I," the result of Example 1 is shown as a graph of "II", and the result of Example 2 is shown as a graph of "III."

Through these result graphs, it can be seen that the classification accuracy of determining whether a fire occurred was 95.95% even in a data-imbalance situation where the data was divided at a ratio of 8:1:1.

Accordingly, the video processing method according to another embodiment of the present invention can effectively determine whether a fire has occurred even in a data imbalance situation while fundamentally preventing the exposure and infringement of personal information.

The video processing system according to an embodiment of the present invention performs a learning process to determine whether a fire has occurred using a feature map in which an original video is difficult to recognize and personal information is protected, and thus it is possible to fundamentally prevent the exposure and infringement of personal information.

The video processing method according to another embodiment of the present invention has the effect of effectively determining whether a fire has occurred even in a data imbalance situation while fundamentally preventing the exposure and infringement of personal information.

Although the technical spirit of the present invention has been specifically described according to the above preferred embodiments, it should be noted that the above-described embodiments are for illustrative purposes only and not for limitation purposes.

Also, those skilled in the art will understand that various implementations are possible within the scope of the technical spirit of the present invention.

What is claimed is:

1. A video processing system comprising:
   multiple unmanned aerial vehicles (UAVs) configured to capture a video of a fire site,
   wherein each UAV has a control unit including an input layer and a first hidden layer; and
   a central server connected to the multiple UAVs by wireless communication,
   wherein the control unit of each UAV separately comprises the input layer and the first hidden layer of a deep neural network, and a central control unit of the central server separately comprises multiple hidden layers and an output layer of the deep neural network,
   wherein the deep neural network is composed of the input layer, the first hidden layer, the multiple hidden layers, and the output layer, and
   wherein the control unit of each UAV is configured to extract a feature map obtained by distorting the video of the fire site by inputting pixel information of the video to the input layer and executing a convolution operation using a filter via the first hidden layer.

2. The video processing system of claim 1, wherein the control unit of each of the multiple UAVs transmits, to the central server through a transceiving unit, the feature map obtained by distorting the video via the input layer and the first hidden layer.

3. A video processing method comprising operations of:
   (A) allowing a central control unit of a central server to transmit a signal for requesting video information of a fire site to each of multiple unmanned aerial vehicles (UAVs) through a central transceiving unit, each UAV comprising a control unit including an input layer and a first hidden layer of a deep neural network;
   (B) allowing a control unit of each of the UAVs to extract a feature map obtained by distorting acquired video of the fire site by providing pixel information of the video to the input layer and executing a convolution operation using a filter via the first hidden layer and transmit the feature map to the central server;
   (C) allowing the central control unit of the central server to sum and regenerate the feature map by performing a convolution operation on the summed feature map, the central control unit comprising multiple hidden layers and an output layer of the deep neural network;
   (D) allowing the central control unit to perform computation by substituting the regenerated feature map into an activation function;
   (E) allowing the central control unit to execute a pooling operation using a value output using the activation function;
   (F) allowing the central control unit to compute a loss value using a pooling operation value and a preset target output value;
   (G) allowing the central control unit to acquire a modified value for a parameter using the computed loss value and update the parameter using the acquired modified value for the parameter; and
   (H) allowing the central control unit to re-execute operations (C) to (G) using the updated parameter,
   wherein the control unit of each UAV separately comprises the input layer and the first hidden layer of the deep neural network, and the central control unit of the central server separately comprises the multiple hidden layers and the output layer of the deep neural network.

4. The video processing method of claim 3, wherein the deep neural network is composed of the input layer, the first hidden layer, the multiple hidden layers, and the output layer.

5. The video processing method of claim 3, wherein the control unit of each UAV transmits, to the central server through a transceiving unit, the feature map obtained by distorting the video via the input layer and the first hidden layer.

6. The video processing method of claim 3, wherein the operation (C) further comprises:
   allowing the central control unit to concatenate the summed feature map; and
   allowing the central control unit to perform a convolution operation on the concatenated feature map.

7. The video processing method of claim 4, wherein the operations (B) to (H) use a split learning algorithm for spatiotemporal learning using the deep neural network.

* * * * *